United States Patent [19]

Wilson

[11] Patent Number: 4,624,484
[45] Date of Patent: Nov. 25, 1986

[54] SHRINK-FIT CONNECTOR FOR ELECTRICAL WELL SUBSURFACE HEATING PROCESSES

[75] Inventor: Robert Wilson, Plano, Tex.

[73] Assignee: Atlantic Richfield Company, Los Angeles, Calif.

[21] Appl. No.: 620,281

[22] Filed: Jun. 13, 1984

[51] Int. Cl.$^4$ ............................................. F16L 55/00
[52] U.S. Cl. ........................................ 285/45; 285/48; 285/332; 285/381; 138/109; 29/247
[58] Field of Search .......................... 285/53, 332, 381; 138/109, 149; 29/247, 525; 156/84, 86; 432/233, 234

[56] References Cited

U.S. PATENT DOCUMENTS

| | | | |
|---|---|---|---|
| 1,906,829 | 2/1932 | Acly | 29/525 |
| 2,359,239 | 5/1949 | Newton | 285/53 |
| 2,972,808 | 4/1957 | Litton | 285/332 |
| 3,009,013 | 4/1958 | Raue et al. | 29/525 |
| 3,224,795 | 9/1962 | Conley | 138/109 |
| 3,417,786 | 8/1966 | Schnabel | 138/109 |
| 4,516,608 | 5/1985 | Titus et al. | 138/149 |

Primary Examiner—Cornelius J. Husar
Assistant Examiner—Anthony Knight
Attorney, Agent, or Firm—M. David Folzenlogen; Michael E. Martin

[57] ABSTRACT

There is described an insulating connector for the wellhead of an electrode well used for heating a subsurface formation by electrical power dissipation in the formation. The insulating connector has two iron base metal fittings (for example, steel flange halves) heat shrink fitted to a piece of ceramic pipe with a nonferrous second metal between the outer surface of the ceramic and the inner surface of the metal fittings. The nonferrous metal (for example, copper) has a lower yield than steel and a higher thermal expansion coefficient than the iron base metal and deforms, compensates and distributes the stresses caused in the shrink fitted members by the differences expansion between steel and ceramics. Other features which improve the quality and control of various parameters affecting the heat shrink fit insulating connector include the amount of interference required per inch of outside diameter of the ceramic member, length of interference surface relative to the outside diameter of the ceramic member, matching slightly tapered mating surfaces, bevelling the outside surface of the overlapping inner end of the metal members, and using a ceramic member with a flow passage larger than the flow passage through the metal members.

17 Claims, 1 Drawing Figure

U.S. Patent     Nov. 25, 1986     4,624,484
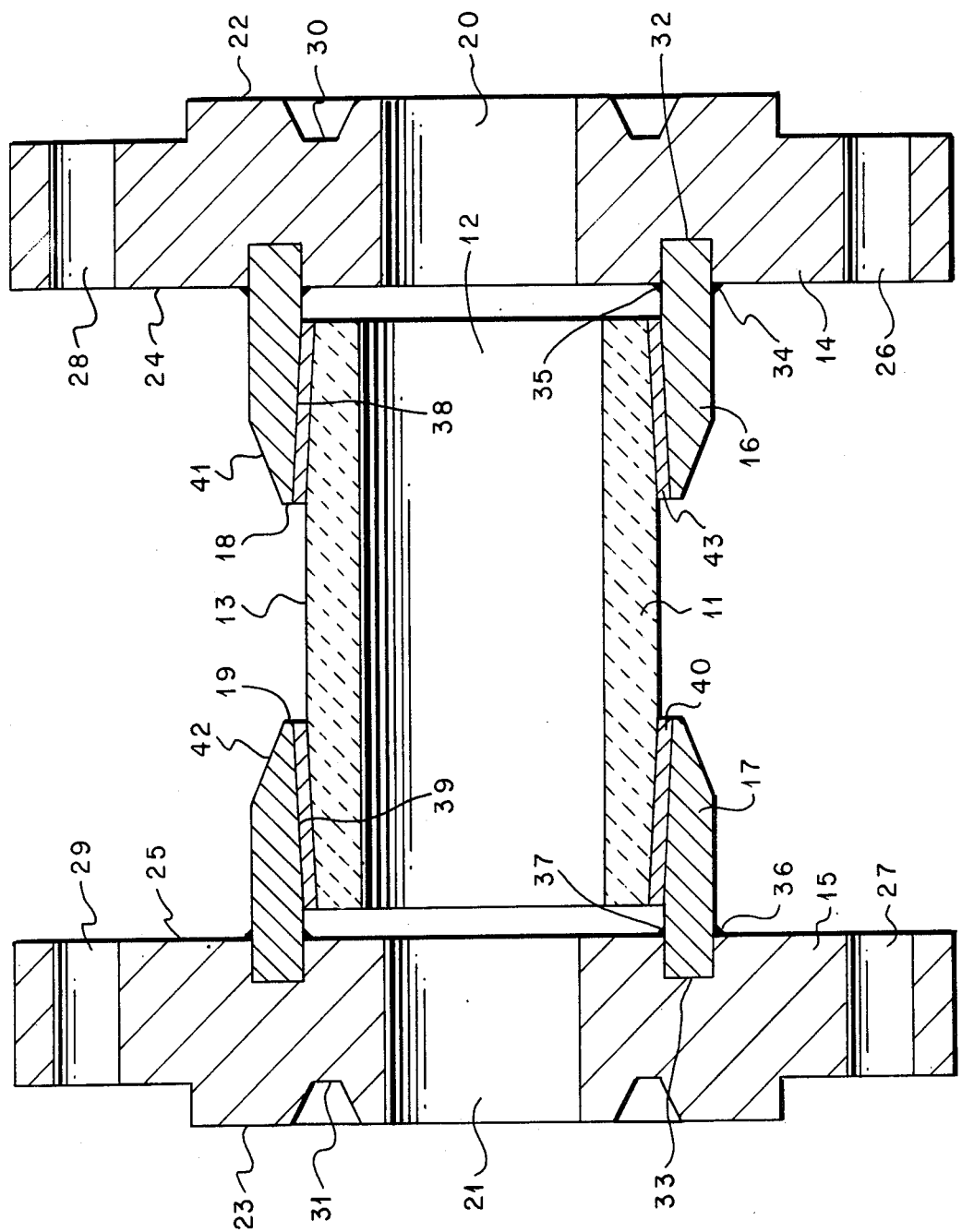

SHRINK-FIT CONNECTOR FOR ELECTRICAL WELL SUBSURFACE HEATING PROCESSES

BACKGROUND OF THE INVENTION

This invention pertains to a special wellhead electrical insulating connector for electrode wells used for electrical heating of a subsurface viscous oil bearing formation. More particularly, this invention concerns an iron base metal and ceramic insulating connector wherein the outer surface of the ceramic and the inner surface of the metal are joined by heat shrink fitting with an intermediate layer of high expansion, softer, stress controlling nonferrous metal.

In the recovery of oil from viscous oil bearing formations it is usually possible to produce only a very small portion of the original in-place oil by natural or primary production which relies solely on the natural forces present in the formation. A variety of artificial recovery techniques, therefore, have been employed to increase oil recovery. It has been proposed, for example, in U.S. Pat. Nos. 3,642,066; 3,874,450; 3,848,671; 3,948,319; 3,958,636; 4,010,799 and 4,084,637, to use electrical power to add heat to a subsurface pay zone containing tar sands or viscous oil to render the viscous hydrocarbons more flowable. In general, two or more electrodes are connected to an electrical power source and are positioned at spaced apart points in contact with the earth in a manner such that when electric current is passed between the electrodes it will heat visocus oil in the subsurface formation. Voltages of 200 volts and up to and exceeding 1000 volts are applied to the electrodes. Currents up to 1800 amperes are passed between electrode wells. Most of the heat generated by power consumption in or near the formation occurs in and adjacent to the electrode well and heat transfer outward into the formation by conduction is slow. This leads to temperatures up to and possibly exceeding 500° F. This heat is conducted by the tubing and casing to the wellhead of the electrode wells. The wellhead fittings, therefore, must be capable of safely withstanding these elevated temperatures.

In subsurface electrical heating processes whether or not the electricity is flowed through the casing tubing, the voltages and currents used cause power leakage flow and discharge to surface equipment if standard wellhead electrical isolating devices are employed. Standard wellhead electrical isolating devices have closely spaced metal parts and thin electrical insulating material. The space between the metal parts is easily shorted by debris, chemicals and the products of corrosion. The electrical paths around the electrical insulation allow power leakage and sometimes act as power consuming resistance paths which generate heat at the wellhead. It would, therefore, be desirable to provide a reliable wellhead connector that reduces power leakage losses and does not provide resistance paths that act like an electrical resistance heater. It is an object of this invention to provide a wellhead connector which acts as an electrical insulator. It is a further object of this invention to describe an insulating connector for a wellhead of an electrode well used in electrically heating a subsurface formation in which extreme stresses are relieved or prevented and other stresses are better controlled. It is still a further object of this invention to provide an insulating connector that will safely withstand temperatures up to and exceeding 500° F.

SUMMARY OF THE INVENTION

In accordance with the present invention, there is provided an insulating connector especially suited for use in the wellhead of an electrode well used in electrical heating of a viscous oil bearing subsurface formation wherein at least one metal well string extends from the wellhead downward toward the subsurface formation. The connector has good electrical insulating properties while providing adequate strength and reliability for the elevated temperatures and high voltages and currents encountered in heating a subsurface formation by electrical power dissipation in the formation. The insulating connector is capable of withstanding temperatures up to 500° F. and may be formed to withstand even higher temperatures. The connector is comprised of three essential elements heat shrink fitted together. The first element is a generally tubular shaped ceramic member. Ceramic is a good electrical insulator and a poor conductor of heat. Two iron base metal members (for example, bolt-type flange halves especially adapted to this invention) and an inner nonferrous second metal are heat shrink fitted to the ceramic member. The second metal (for example, copper) has a higher thermal expansion coefficient than the iron base metal. Ordinary ferrous metals have a thermal expansion coefficient greater than ceramics. As the temperature increases the metal members expand greater than the ceramic and the amount of interference and the strength of the heat shrink fit are reduced. In order to obtain sufficient joint strength at elevated temperatures it is ordinarily necessary to increase the amount of interference of the heat shrink fitted joint at room temperature. This stresses the ceramic to a stress level greater than permitted for acceptable safety factors and may even cause failure. In addition, cycling temperatures create deformation stresses which tend to be localized and exerted at unsafe levels. The second metal is positioned and has thermal expansion and deformation characteristics which reduce peak stresses and more uniformly distribute the stresses while maintaining adequate heat shrink joint strength.

Other features which improve the quality and control of various parameters affecting the heat shrink fit insulating connector include the amount of interference required per inch of outside diameter of the ceramic member, length of interference surface relative to the outside diameter of the ceramic member, matching slightly tapered mating surfaces, bevelling the outside surface of the overlapping inner end of the metal members, and using a ceramic member with a flow passage larger than the flow passage through the metal members.

BRIEF DESCRIPTION OF THE DRAWING

The drawing is a side longitudinal cross-sectional view of an insulating connector using flange-like members and having all of the features covered by this disclosure. The drawing is not to scale.

DETAILED DESCRIPTION OF THE PREFERRED EMBODIMENTS

In the heating of a subsurface, viscous oil bearing formation by passing electrical current through the formation, various types of electrode well configurations have been proposed. In general, the electrode well has one or more casing strings and a tubing string which extend downward toward the subsurface formation.

The tubular casing and tubing strings are connected to a wellhead which has casing and tubing heads which form a part of a wellhead. The wellhead is also connected to flowlines leading to various types of injection or producing equipment and tanks. In some installations, an electrode is lowered through the casing or tubing on a cable to an appropriate point from which electrical current may be passed through the formation. In other installations, the casing or tubing may be used both as an electrical conductor and as an electrode.

Regardless of the type of electrode well completion, voltage and electrical current are present in casing and tubing. As electrical power is consumed, heat is generated adjacent or in the electrode well causing increase wellhead temperature. An electrical insulator that can withstand elevated temperatures is required in the casing or tubing string. Ordinary insulating gaskets, bolt insulators and insulating washers are inadequate for the voltages and temperatures encountered in electrode wells used in electrical heating of subsurface formation. Adequate leak tightness and pull-out strength approaching steel can be achieved by heat shrink fitting bolt-type flange halves or other types of steel fittings to a piece of ceramic pipe. But the difference in expansion between the ceramic and steel causes a decrease in shrink fit interference as the temperature increases. For example, for ten inch diameter ceramic and a shrink-on N-80 steel member it is necesary to use 0.025 inch interference at room temperature to have 0.005 inch interference remaining at 500° F. The high interference at room temperature creates considerable stress in the ceramic and steel. Normally, this problem would be solved by using less room temperature interference and derating the insulator to a lower temperature. Another solution would be to use a higher yield, more expensive ceramic if a different stronger ceramic is available. Still another solution is to use a controlled expansion metal alloy (for example, 42% nickel, or titanium) to better match the expansion properties of the ceramic, but such alloys are very expensive and are not readily available.

In the drawing there is shown a different solution. There is illustrated a strong heat shrink fitted ceramic and steel insulating connector using conventional materials. The wellhead insulating connector is comprised of tubular ceramic member 11 formed of a suitably strong ceramic material of good electrical insulating properties and having a thermal coefficient of expansion lower than that of ordinary iron base metals used in wellheads, flowlines and casing and tubing strings in oil and gas production. The thermal coefficient of expansion of the ceramic is $8.7 \times 10^{-6}$ inch per inch per degree Centigrade anf the thermal coefficient of expansion of steel varies between 10.5 to $13.5 \times 10^{-6}$ inch per inch per degree Centigrade between 60° and 500° F. One such ceramic material is Corning pyroceram. This is the type of ceramic used in nonbreakable chinaware. A more preferred ceramic material is the mullite ceramics containing 85% to 95% aluminia (for example, Coors-type AD 85 and AD 94). Aluminum oxide ceramics are strong and readily ground. They are also less susceptible to acid fluids used in well treatments than the pyroceram ceramics. The ceramic should be suitable for grinding for perfect fit purposes for reasons hereinafter made apparent. Tubular ceramic member 11 has a central generally cylindrically shaped internal flow passage 12 extending longitudinally through the ceramic member. This flow passage permits the insulating connector to be used in the wellhead of an electrode well as a part of the wellhead and tubing or casing string. The ceramic member has a generally cylindrically shaped outer surface 13 which optionally is slightly tapered at about 0.5 degrees in a manner such that the outside diameter of the tubular ceramic member is slightly smaller at its ends. The degree of taper in the drawing is exaggerated for illustration purposes.

Shown are two iron base metal members 14 and 15 with tubular sections 16 and 17, respectively, projecting inwardly overlapping and extending over and around the two ends of ceramic member 11 and in a manner such that inner ends 18 and 19 of the tubular sections are spaced apart and do not touch each other. This electrically isolates the metal members from each other. Preferably, the ends of the tubular sections will be separated by a distance of at least two inches. A spacing of two or more inches assures electrical insulation. Metal members 14 and 15 have central generally cyclindrically shaped internal flow passages 20 and 21, respectively, extending through the metal members and in line and in communication with flow passage 12 extending through ceramic member 11. The diameter of flow passage 12 in the ceramic member is greater than the diameter of flow passages 20 and 21. This reduces possible damage to the ceramic member when tools or cables are lowered into and removed from an electrode well using the insulating connector of this invention. Metal members 14 and 15 are any sort of coupling or flange suitable for connection to a well string or wellhead. Bolt-type flange halves are preferred since they may be connected in the well system without subjecting the ceramic member and shrink fit joints to torque. Accordingly, metal members 14 and 15 are shown as bolt-type flange halves with tubular sections 16 and 17 extending inwardly and toward each other. The flange halves have mating or outer face surfaces 22 and 23 and inner face surfaces 24 and 25. Illustrated are standard ring-joint or seal ring flanges which have standard bolt holes 26, 27, 28 and 29, which are usually provided in multiples of four with pairs on the same center or diameter line. The flange members are shown with ring grooves 30 and 31 for use with a metallic seal ring. Standard ring joint flanges are usually marked with the ring groove number. Seal ring flanges are shown, but it is understood that any type of flange may be used (for example, male-female flanges and tongue-and-groove flanges). Since half flanges are frequently supplied in matching pairs, it is preferred that half flange metal members be obtained in matching pairs and the respective mating halves used with the insulating connector of this invention.

Tubular sections 16 and 17 are shown inserted into circular grooves 32 and 33 respectively and welded in place by inner and outer welds 34, 35, 36 and 37. This method of attaching is especially suited to the characteristics of the insulating connector because the bore diameter and thickness of ceramic member 11 are greater than normally used with wellhead flange halves. Inner generally cylindrical walls 38 and 39 of the tubular sections optionally have slightly tapered surfaces of about 0.5 degrees so that the diameter of the cylindrical walls nearest the flange ends is less than the inside diameter of the tubular sections at ends 18 and 19. The degree of taper is exaggerated for illustration purposes. This taper matches the taper previously mentioned of the outer surface of the ceramic member ends. The matching tapers of the ceramic member and iron base tubular sections improves the seal between the outer surface of the ceramic member and the inner walls of the tubular sections.

The iron base tubular sections are shown heat shrink fitted to ceramic member 11 with a layer of non-ferrous metal 40 and 43 between cylindrical walls 38 and 39 and outer surface 13 where the ceramic and tubular sections overlap and extend over and into each other. The thickness of the nonferrous metal may be very thin. The nonferrous metal has a yield strength less than that of the iron base metal. It also has a thermal coefficient of expansion greater than the thermal coefficient of expansion of the iron base metal in metal members 14 and 15. The preferred nonferrous metal is copper which has a yield of about 40,000 psi and coefficient of expansion of 14 to $17.8 \times 10^{-6}$ inch per inch per degree Centigrade between 60° and 500° F. compared to steel having a coefficient of expansion of 10.5 to $13 \times 10^{-6}$ over the same temperature range and a yield greater than 70,000 psi. Tin which has a yield of less than 20,000 psi and a thermal coefficient of expansion of about $26.9 \times 10^{-6}$ inch per inch per degree Centigrade may also be used as the nonferrous metal. The nonferrous metal is an essential element of this invention. The tubular sections and nonferrous metal are heat shrink fitted on the ends of the ceramic members where they overlap and extend into and over each other. Heat shrink fitting requires that at room temperature the diameter of inner generally cylindrical walls be slightly less than the outside diameter of the ceramic member. The difference in diameters is called interference and is typically measured in mils. The amount of interference required for the heat shrink joint depends on the nature and strength of the materials joined, the service or working requirements for the joint, the diameters, ring thicknesses and coefficients of expansion of the materials joined, the lengths of the interference surfaces, and the friction coefficients between the surfaces of the joints.

For the purposes of this invention, it is preferred that the interference be at least 1 mil per inch of outside diameter of ceramic member 11 (for example, for Coors AD85 alumina ceramic, a room temperature interference of 19.8 mils for 300° F., of 28.3 mils for 400° F. and of 37 mils for 500° F. is preferred for 16.5 inch outside diameter fitted to ASTM A106B steel). For purposes of this invention, it is preferred that the length of the interference surfaces be at least one inch for every 2.5 inches of outside diameter of the ceramic member. For example, for ASTM A106B steel shrink fitted to Coors AD 85 ceramic to be subjected to a service temperature of 500° F., there is preferred a minimum interference length of 1.06 inches for 2.5 inch OD ceramic, 4.21 inhes for 10 inch OD ceramic, and 6.95 inches for 16.5 inch OD ceramic. The heat shrink fit may be formed by grinding or cutting the mating surfaces to proper dimensions and tapered within close tolerances (for example, with 0.0005 inch and with a number 60 finshed). This assumes proper fit both for seal and stress purposes. The nonferrous metal layer may be formed by applying a coating of the non-ferrous metal to the overlapping inner surfaces of the walls of the generally cyclindrical shaped flow passage of tubular sections 16 and 17 before the ferrous metal member is heat shrink fitted to the ceramic member. Thereafter, the ceramic member and the iron base metal member with an inner nonferrous layer are properly aligned and the metal members are heated (for example, with band heaters) to a temperature above the maximum design service temperature and to a temperature (for example, 850° F.) high enough to expand the iron base metal until the cylindrical shaped passage through the tubular sections will allow them to be slipped over the end of the ceramic member. A suitable sealing cement may be added to prevent crevice or bimetallic corrosion of the ferrous material.

In operation, very high tensile and compressive stresses would result from expansion, shrinking and bending of the ceramic and ferrous members if it were not for the intermediate layer of lower yield strength non-ferrous metal having a thermal coefficient or expansion greater than the ferrous metal. The properties of the nonferrous metal causes it to yield or deform to compensate for the differences in expansion between the ferrous metal members and ceramic members. The non-ferrous metal more uniformly distributes the stresses and thereby reduces the chances for incurring severe localized stresses. Sometimes the diameters and thicknesses are such that high stresses may arise in ferrous tubular sections 16 and 17 and ceramic member 11 near inner ends 18 and 19. In such cases, the magnitude of these stresses may be prevented by the outer surface of tubular sections 16 and 17 near ends 18 and 19 to reduce the thickness of these tubular sections. This is illustrated by bevelling surfaces 41 and 42.

The present invention has been described herein with reference to particular embodiments thereof. It will be appreciated by those skilled in the art, however, that various changes and modifications can be made therein without departing from the scope of the invention as present.

I claim:

1. An insulating connector for a wellhead of an electrode well comprising a tubular ceramic member having a central generally cylindrical shaped internal flow passage extending therethrough; said ceramic member having a generally cylindrical shaped outer surface; two opposed iron base metal bolt type flange members; said iron base metal having a thermal coefficient of expansion greater than the thermal coefficient of expansion of the ceramic; each of said flange members having a central generally cylindrical shaped internal flow passage extending therethrough; one of said flange members being adapted to be connected to and disconnected from a part of a wellhead and the other of said flange members being adapted to be connected to a well string without exerting a substantial torque on said ceramic member; each of said flange members having a generally coaxial tubular section with an inner end; said tubular sections each forming at least a part of said flow passage extending through said flange member; each of said tubular sections having parts overlapping and extending over and around an end of said ceramic member by a distance of at least one inch and in a manner such that said inner ends of said tubular sections are substantially spaced apart; a layer of a second metal between said parts of said tubular sections and said outer surface of said ceramic member where said tubular sections overlap said ceramic member; said second metal having a yield strength less than said iron base metal of said tubular sections of said flange members and having a thermal coefficient of expansion greater than the thermal coefficient of expansion of said iron base metal in said flange member, and said tubular sections each having been heat-shrink fitted to said ceramic member.

2. The insulating connector of claim 1 wherein said second metal is copper.

3. The insulating connector of claim 2 wherein said copper second metal comprises a coating applied to said overlapping inner wall surface of said tubular sections before said flange member was heat shrink fitted to said ceramic member.

4. The connector of claim 1 wherein the diameter of said flow passage extending through said ceramic member is greater than said flow passages extending through said flange members.

5. The connector of claim 1 wherein the outer surfaces of said inner ends of said tubular sections are bevelled to reduce the wall thickness of said tubular sections near said inner ends.

6. The connector of claim 1 wherein the inner wall surfaces of said overlapping parts of said tubular sections and the outer surfaces of said ends of said ceramic member extending into said tubular sections have matching tapers of about 0.5 degrees, respectively.

7. The connector of claim 6 wherein said second metal is copper.

8. The connector of claim 1 wherein the interference of the heat-shrink fitting between said ceramic member and said tubular sections is at least one mil per inch of the outside diameter of said ceramic member.

9. The connector of claim 8 wherein said second metal is copper.

10. The connector of claim 1 wherein the length of said overlapping parts of said tubular sections of said flange members and said ceramic member is at least one inch for every 2.5 inches of the outside diameter of said ceramic member.

11. The connector of claim 10 wherein said second metal is copper.

12. The connector of claim 10 wherein the interference of the heat-shrink fitting between said ceramic member and said tubular sections is at least one mil per inch of the outside diameter of said ceramic member.

13. The connector of claim 12 wherein said second metal is copper.

14. The connector of claim 12 wherein the inner wall surfaces of said overlapping parts of said tubular sections and the outer surfaces of said ends of said ceramic member extending into said tubular sections have matching tapers of about 0.5 degrees, respectively.

15. The connector of claim 14 wherein such second metal is copper.

16. The connector of claim 14 wherein the outer surfaces of said inner ends of said tubular sections are bevelled to reduce the wall thickness of said tubular sections near said inner ends.

17. The connector of claim 16 wherein said second metal is copper.

* * * * *